(12) United States Patent
Davidoff

(10) Patent No.: US 10,127,286 B2
(45) Date of Patent: Nov. 13, 2018

(54) SYSTEM AND METHOD FOR SEARCHING STRUCTURED DATA FILES

(71) Applicant: Andrew Seth Davidoff, Rose Valley, PA (US)

(72) Inventor: Andrew Seth Davidoff, Rose Valley, PA (US)

(73) Assignee: Big Sky Sorcery, LLC, Divide, CO (US)

( * ) Notice: Subject to any disclaimer, the term of this patent is extended or adjusted under 35 U.S.C. 154(b) by 411 days.

(21) Appl. No.: 14/947,542

(22) Filed: Nov. 20, 2015

(65) Prior Publication Data

US 2016/0147766 A1  May 26, 2016

Related U.S. Application Data

(60) Provisional application No. 62/082,680, filed on Nov. 21, 2014.

(51) Int. Cl.
*G06F 17/30* (2006.01)
*G06Q 30/08* (2012.01)

(52) U.S. Cl.
CPC .... *G06F 17/3053* (2013.01); *G06F 17/30336* (2013.01); *G06F 17/30554* (2013.01); *G06F 17/30867* (2013.01); *G06Q 30/08* (2013.01)

(58) Field of Classification Search
CPC .......... G06F 17/3053; G06F 17/30336; G06F 17/30554; G06F 17/30867
USPC ....................................................... 707/725
See application file for complete search history.

(56) References Cited

U.S. PATENT DOCUMENTS

| | | | |
|---|---|---|---|
| 2002/0116362 A1* | 8/2002 | Li | G06F 17/30516 |
| 2004/0260621 A1* | 12/2004 | Foster | G06Q 30/02 705/26.62 |
| 2005/0193345 A1 | 9/2005 | Klassen et al. | |
| 2006/0293959 A1* | 12/2006 | Hogan | G06Q 30/00 705/14.25 |
| 2007/0043730 A1 | 2/2007 | Wisely | |
| 2009/0319511 A1 | 12/2009 | Sundaresan | |
| 2011/0282888 A1* | 11/2011 | Koperski | G06F 17/30864 707/752 |

(Continued)

OTHER PUBLICATIONS

PCT Search Report, dated Mar. 4, 2016, pp. 1-9, PCT, USA.

*Primary Examiner* — Cam Linh T Nguyen
(74) *Attorney, Agent, or Firm* — Carter Ledyard & Milburn LLP

(57) ABSTRACT

A computer implemented method, program, system, and apparatus for searching structured databases is disclosed. This invention teaches the collation of results based on the time that a search is performed by a user by sending individual time-based queries to the database such that only a subset of results is obtained for each query. The time associated with each query is recorded in one or more datasets which correspond to the search being performed, and the datasets are consulted before each additional time-based query such that no time period is queried twice for the same search. By querying based on a subset of results existing in a particular time frame, the invention serves to limit load on a database and a user device while also removing the need for de-duplication of results, presenting the user with a collated list of the most relevant results based on the current time.

20 Claims, 10 Drawing Sheets

(56) References Cited

U.S. PATENT DOCUMENTS

2013/0046783 A1  2/2013  Zhang et al.
2013/0346396 A1* 12/2013  Stamm .............. G06F 17/30867
                                           707/722

* cited by examiner findItemsAdvanced for listing durations: 7 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-27T01:48:00'
        filter: 'EndTimeTo'
        value: '2014-05-27T01:59:59' findItemsAdvanced for listing durations: 7 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-30T15:12:48'
        filter: 'EndTimeTo'
        value: '2014-05-30T15:14:11' findItemsAdvanced for listing durations: 7 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-30T15:17:36'
        filter: 'EndTimeTo'
        value: '2014-05-30T15:17:47' findItemsAdvanced for listing durations: 10 (days)
    keywords: 'tom cruise' categories: '617'
        filter: 'ListedIn'
        value: 'EBAY-US'
        filter: 'ListingType'
        value: 'Auction'
        filter: 'EndTimeFrom'
        value: '2014-05-30T20:32:36'
        filter: 'EndTimeTo'
        value: '2014-06-02T14:34:11'

Fig. 5 findItemsAdvanced for listing durations: 10 (days)
    keywords: 'tom cruise' categories: '617'
        filter: 'ListedIn'
        value: 'EBAY-US'
        filter: 'ListingType'
        value: 'Auction'
        filter: 'EndTimeFrom'
        value: '2014-05-30T12:17:24'
        filter: 'EndTimeTo'
        value: '2014-05-30T20:32:35' findItemsAdvanced for listing durations: 5 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-28T15:14:48'
        filter: 'EndTimeTo'
        value: '2014-05-28T15:17:35' findItemsAdvanced for listing durations: 7 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-30T15:14:12'
        filter: 'EndTimeTo'
        value: '2014-05-30T15:17:35' findItemsAdvanced for listing durations: 1 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-24T15:15:12'
        filter: 'EndTimeTo'
        value: '2014-05-24T15:17:35'

Fig. 5 (cont'd)

findItemsAdvanced for listing durations: 10 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-29T15:00:00'
        filter: 'EndTimeTo'
        value: '2014-05-29T20:23:59' findItemsAdvanced for listing durations: 10 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-06-02T15:17:36'
        filter: 'EndTimeTo'
        value: '2014-06-02T15:17:47' findItemsAdvanced for listing durations: 3 (days)
    keywords: 'tom cruise' categories: '617'
        filter: 'ListedIn'
        value: 'EBAY-US'
        filter: 'ListingType'
        value: 'AuctionWithBIN', 'FixedPrice', 'Classified', 'StoreInventory'
        filter: 'EndTimeFrom'
        value: '2014-05-26T15:15:00'
        filter: 'EndTimeTo'
        value: '2014-05-26T15:17:35'

SYSTEM AND METHOD FOR SEARCHING STRUCTURED DATA FILES

FIELD OF THE INVENTION

The present invention relates to a system and method for searching structured data and enhancing search results.

BACKGROUND OF THE INVENTION

Structured online databases continue to grow and be used today. For example, shopping or browsing items that can be purchased on the Internet is a common activity in today's society. Shopping, auction, social, and other websites provide the convenience of browsing from home or office, and can list hundreds of thousands or millions of items that may be of potential interest to a user. Websites such as eBay provide access to a large variety of consumer products that could be of interest to a shopper. These products combine to form lists which are constantly being added to and subtracted from as the merchant or third party sellers add items for sale and as other consumers purchase items, thus removing listings. Searching through all of the items can be a cumbersome task. Repeated searches for the same types of items turn up items that the consumer has seen before and decided not to buy. Other websites provide other forms of continuously updated lists of numerous items through which a user must browse to find valuable content—a similarly cumbersome task. Additional complications stem from limitations of the database searched, limitations of a user's hardware and software, and limitations of a user's ability to digest a large amount of data in a single session.

In the particular example of eBay, every evening a consumer may want to browse or search for certain types of items to purchase. eBay lists all active listings commingled with any items listed since the night before. The consumer can choose to view the auction items resulting from a search in a few ways, including by "most recently listed" or "items ending soonest" or those with a "Buy-It-Now" option. In either scenario, the consumer will usually have to waste time looking through items previously seen, or risk missing a great deal on a "Buy-It-Now" item just listed (and purchased by another consumer) while the consumer was busily scanning through the items ending soonest.

The consumer has roughly the same need to evaluate an auction item ending in ten minutes as they do a "Buy-It-Now" item that was listed ten minutes previously—each might represent a great purchase opportunity, but as each minute passes, the consumer's need to evaluate the auction item increases while the likelihood that they are missing a great deal in the "Buy-It-Now" item decreases.

If an eBay search yields forty thousand listings, the consumer might reasonably scan through them all over a period of a week or two, but performing that operation without an effective way to de-duplicate results and without risking missing new buyable listings every evening is not feasible.

U.S. Pat. No. 6,487,553, to Emens et al. and assigned to International Business Machines Corporation describes a method for reducing search results by manually or automatically excluding previously presented search results. However, this method requires that the search results be stored locally, and that the user either flags results to be excluded or flags results to be presented a second time.

U.S. Pat. No. 8,244,709, to Wen et al. and assigned to eBay, Inc., describes a method of automatically updating searches. In this method, however, the search results must be stored locally in order to be compared against each other.

There exists a need for a way to see all results without storing the data, as a consumer cannot retrieve all search results from a database and subsequently delete each result after each view. This scenario could necessitate a retrieval of an overwhelming amount of listings. There also exists a need for a way to see all items resulting from a particular search, ordered according to time sensitivity. By contrast, if the consumer has already evaluated an item and has discarded it, there needs to be a reliable method to assure the consumer doesn't see the same item in the search results again.

BRIEF SUMMARY OF THE INVENTION

Optimal time windows are calculated and used to present manageable search results in a manner that avoids duplication when the same data files are sequentially searched. By recording the time periods queried in a dataset, no duplicates of results are presented because no time period is queried more than once. In the method of the present invention, neither results nor searches need be stored, and every matching result is unconditionally presented to the user. Whether there are five thousand results or five million results, the present invention works identically, and with identical performance. For large result sets, the present invention is even more efficient, as only a manageable number of results that are intended to be displayed are retrieved.

The invention is particularly useful for searching large databases where saving prior search results is not permitted or would drain available data storage resources. The present invention first determines the total number of results, and then searches for them sequentially in limited time windows in order to reveal them to a user in a relevant manner and at a manageable pace. In calculating the time windows, which are based on the total number of results for a particular search or group of searches, the invention aims for a time window which will yield a manageable number of significant results both for the user and the user's device.

The present invention is designed to scale infinitely, as there is no fundamental limitation on the number or complexity of the searches, or the number of results that may be returned. Scalability is of particular import when there is a desire to provide a service on the web that might be accessed by several computers or mobile devices, such as a service based on the present invention.

The present invention is further designed to allow a user to query multiple databases simultaneously, include results from various searches, include or omit categories and specific sellers manually or via managed lists, and query according to item specifics, condition, location, delivery date, price, number of bids, and other factors. A user may further be able to search for UPC numbers or website product identifiers (or any other identifying numbers), constrain results to items located in specific parts of a database, and use a database's domain histograms to filter the results by, e.g., size, brand, color, material, etc. Additionally, the present invention allows a user to query a database by periods of dimensional data other than time (the only requirement being that resolution of the data proceeds monotonically). In fact, any permutation of individual search constraints which is supported by an associated database may be supported by the invention. Any such search may be executed singly or in concert with other such searches, in which case any results produced may be collated.

BRIEF DESCRIPTION OF THE DRAWINGS

FIG. 5 shows an example of query calls made to eBay according to one embodiment of the present invention.

FIG. 6 shows another screenshot of one embodiment of the invention illustrating an opportunity for a user to further limit search results for the current and other search groups by including or excluding items specific to a particular seller on the database.

DETAILED DESCRIPTION OF THE INVENTION

Definitions

Figure 1:
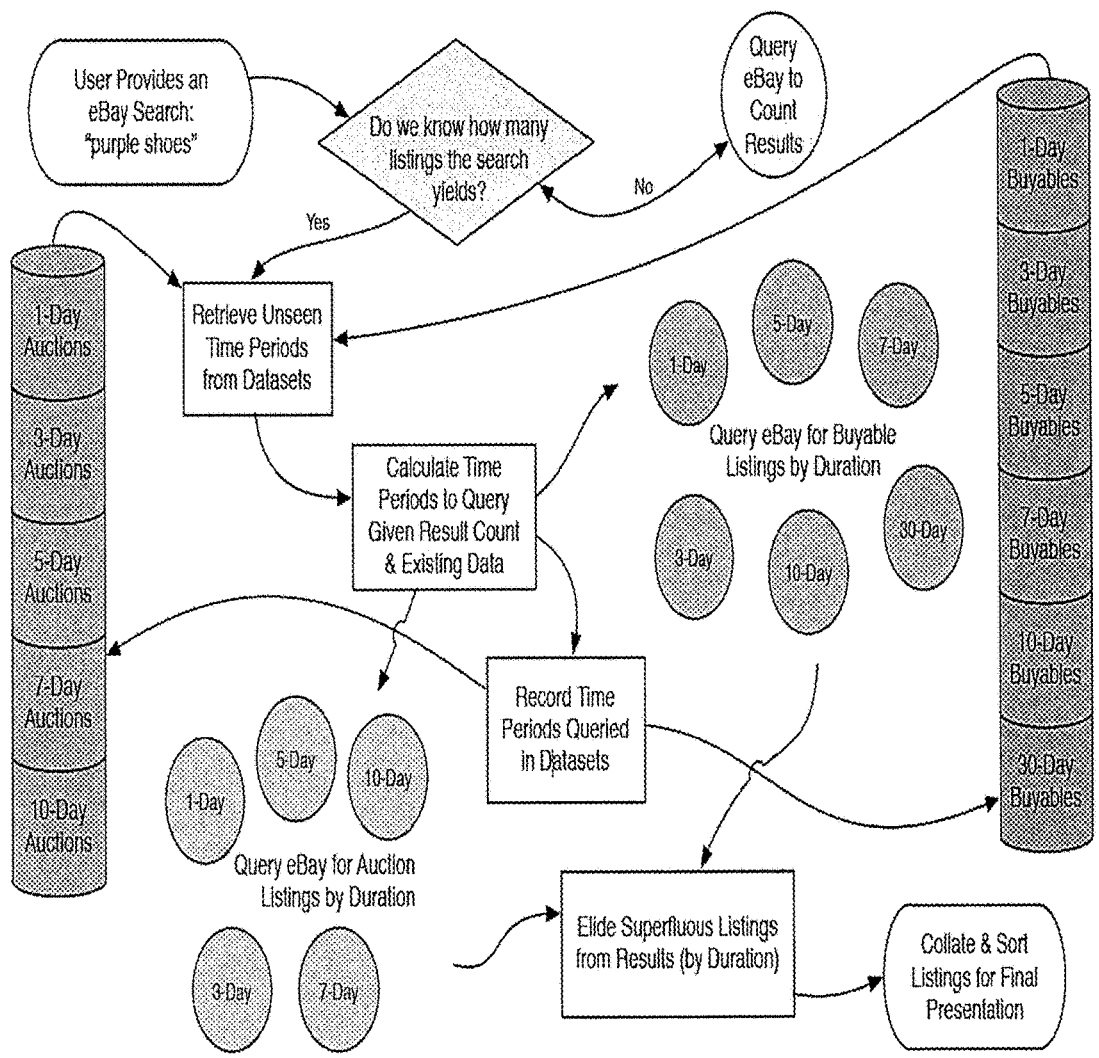
FIG. 1 is a first flow chart showing the overall operation of one embodiment of the present invention.

"Time window," as used herein, is defined as a period of time in which a manageable number of relevant results is calculated to exist. "Preferred time window," "preferable time window," or "optimal time window," as used herein, is defined as that time window which yields the most convenient number of relevant results with regard to specific search criteria while also placing the least amount of load on the target database and user device. For example, the system and method disclosed herein may calculate several time windows, one for each disparate set of search criteria, but querying of the database, as described herein, will occur on the order of only the shortest time window calculated—the preferred, or optimal, time window. This optimal time window may be spread among various un-queried time periods. It may also further be reduced, if necessary, to ensure that the user is presented with a manageable quantity of results.

"Time-based query(ing)," or "time window-based query(ing)," as used herein, is defined as sending one or more requests to a database, and asking for results which are uniquely positioned by time, based on the optimal time window calculated and time data previously recorded in the dataset(s).

"Search," as used herein, is defined as one set of related criteria input by a user. "Search group," or "group of searches," as used herein, may be defined as one search or a combination of two or more searches, each search having criteria disparate from the other search(es). Search groups allow for a user to view results from various searches together in a collated fashion.

"Dataset(s)," as used herein, is defined as a unit for storing information regarding those ranges of time which have been queried. In certain embodiments, a dataset may further store search statistics in addition to time information. This additional information may be used, e.g., to optimize a preferred time window calculation. For each search or search group, there exists at least one dataset, which records at least the time periods queried for that search or search group. Two or more adjacent time period records within a dataset may further be combined and compacted into one record in order to further save resources and prevent latency. Multiple datasets may be employed if the particular organization of a target database is more complex. The collation of results from multiple searches or search groups is afforded by the ability of each search or search group to be directed by the same dataset(s). A dataset may alternatively store dimensional data other than time if, e.g., the querying performed is based on data other than time.

"Database," or "target database," as used herein, is defined as an Application Program Interface (API) or a collection of structured data. Such databases are the services that are queried by an application or program employing the present system and method in order to present a user with a manageable number of the most relevant search results.

"User," as used herein, is defined as a human interfacing with an application using the disclosed method and system.

"Client," as used herein, is defined as a particular device on which a user may interface with the application of the present invention. The present invention moves the search intelligence into the client, rather than relying on the database itself, whose structure may be less sophisticated.

In describing the preferred embodiments of the present invention, reference will be made herein to FIGS. 1-8 of the drawings, in which like numerals refer to like features of the invention. Features of the invention are not necessarily shown to scale in the drawings.

Utility of the Invention

The present invention is not an abstract idea or mere mathematical algorithm. It is particularly adapted to take any structured and continuously supplemented database of time-sensitive data and search the data in a manner keyed to the present time. Such databases must be created and maintained using computer memories and systems particularly adapted to them. While databases might store time information (e.g. the time that a product was listed, when the listing ends, how long the listing will last), such time information does not necessarily comprise the primary structure of such databases (i.e., the databases are organized primarily using parameters other than time). Also, no continuously supplemented database can be structured or organized based on a particular time that an individual might request information, since that particular time is unknown until the request is made. The present invention offers a novel system and method for taking time-sensitive computer database data and presenting it in a time-structured manner based on the particular time that the data is requested. Such reorganization occurs as a result of computer processes and without any requirement for a user to input specific search criteria with regard to time, since the only time input required may be provided by the system itself The present invention improves the speed with which a given user finds an urgent or topical result, because it may be adapted to the technical parameters of certain types of computer databases. The invention presents results in a concise, manageable, and latency-reducing manner based on its determination of which results are most relevant to the current time and what portion of the total results will satisfy the user.

The present invention may also be used to limit time-structured and continuously updated database search results to those which have not been seen. In a prior art search, a user enters search criteria and the results are received without any further limitations. The present invention includes specially adapted steps in the search process so that a user performing a search does not retrieve the same result twice, thus avoiding the prior art necessity of determining if a result is a duplicate that may be ignored. These steps, referred to herein as time-based querying, avoid the necessity of de-duplication by retrieving results from a certain database based solely on the time data associated with each result. Once one period of time is queried, the time data corresponding to that period is recorded such that, for the particular search or search group, the same period is not queried a second time. There is no requirement for storing any additional data other than time within the system. Such querying based on periods of time avoids the need for additional resources and complications associated with requiring storage of additional data to perform any de-duplication of results. It therefore presents one solution to a problem particular to querying certain types of databases.

In addition, due to the fact that only time data needs to be stored, the present invention improves the speed of obtaining focused search results. Very few computer resources are required to scale up for multiple users or simultaneous operations. Because the work of constraining search results is performed by the database being queried, and the work of discarding unwanted results is performed by the user, the present invention relieves the servers running the systems and methods described herein from additional load, thus making the invention readily scalable. Furthermore, retrieving less data lowers the cost of bandwidth and processing power while improving user experience due to faster performance.

Figure 2:
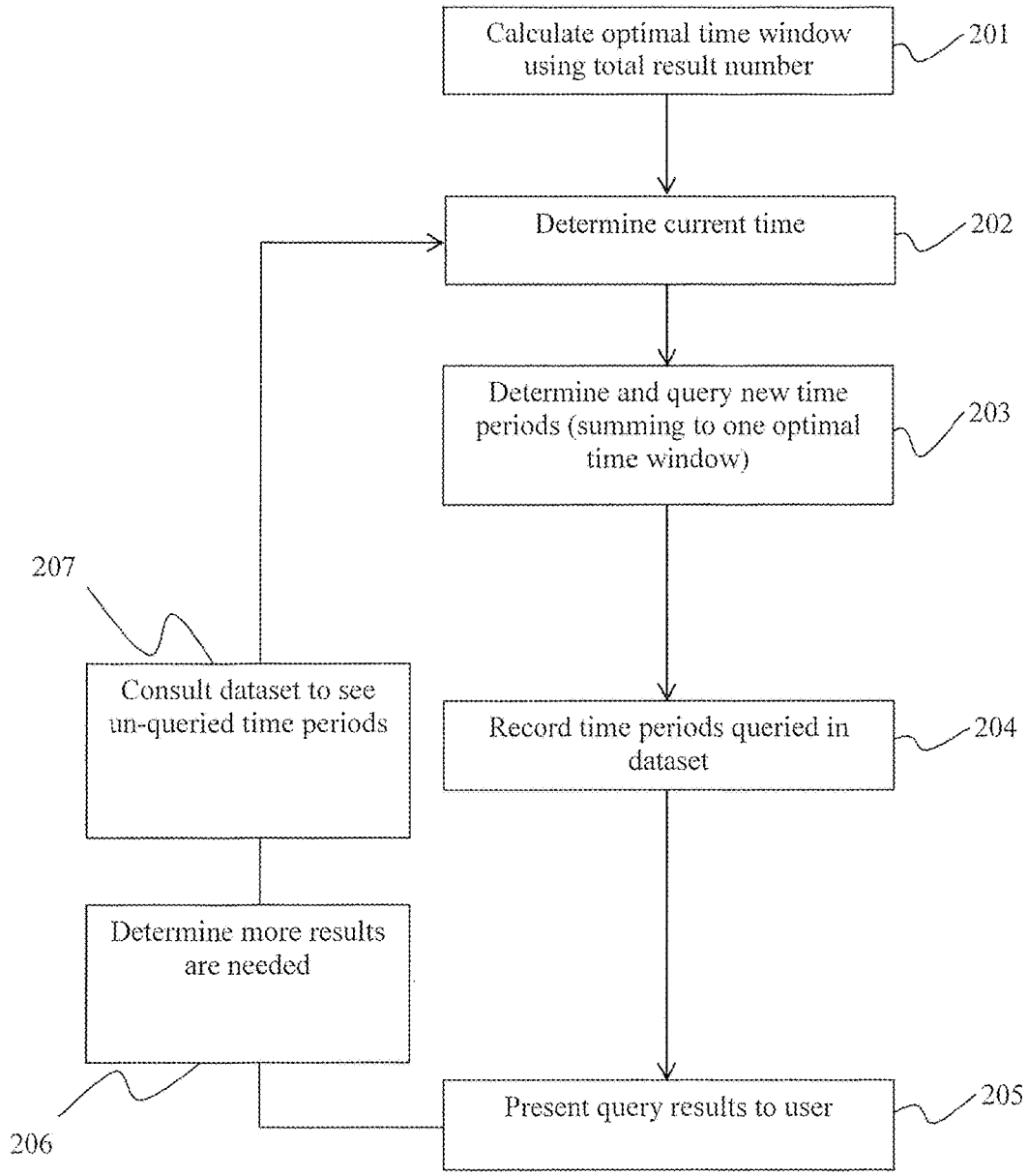
FIG. 2 is a second flow chart showing the steps for time window-based querying according to one embodiment of the present invention.
Figure 3:
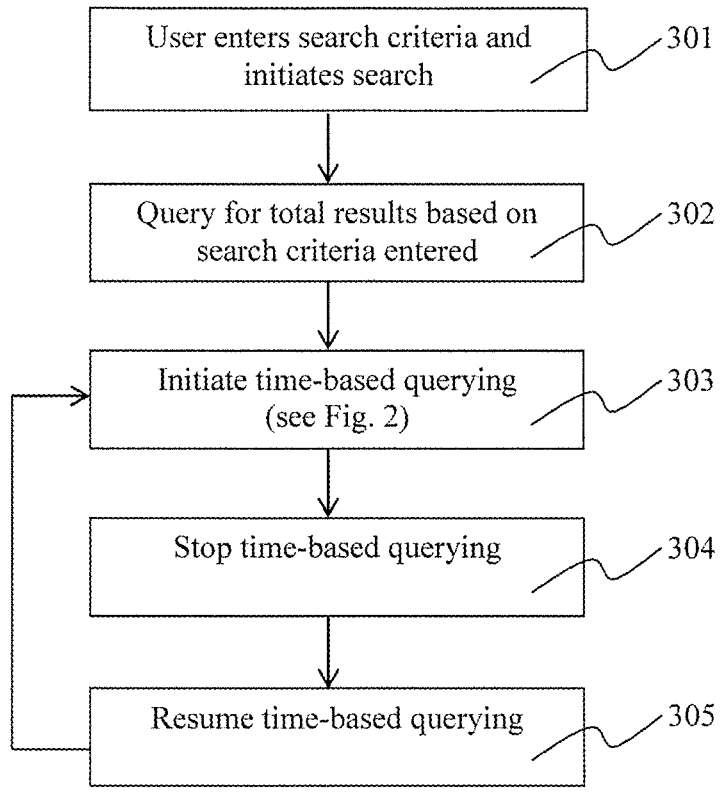
FIG. 3 is a third flow chart showing the steps for finding and presenting urgent results according to one embodiment of the present invention.

Overview of the Method (FIGS. 2 and 3)

The general process for finding and presenting results, as shown in FIG. 3, may be described as follows. A user enters the application and initiates a particular search or group of searches by entering search criteria into a search or dialogue box presented to the user 301. The application then determines the total number of existing results based on the search criteria entered via a single query to the database 302. Once the total result amount is determined, time-based querying begins 303 in at least one direction relative to the dataset. See FIG. 2 for a more detailed description of the steps comprising time-based querying. The direction relative to the dataset may be, for example, backwards in time from the current time (other embodiments may perform time-based querying in more than one direction within the dataset, e.g., backwards as above as well as forwards in time from a point within the dataset). The time-based querying will continue as the user views results and until the program determines to stop time-based querying 304 (this may occur, e.g., when the user exits the application; however, in certain embodiments, the time-based querying may continue even after the user exits the application). Even though the time-based querying is stopped, the search or search group may be saved. Thus, when time-based querying resumes 305, the program remembers all previous activity with regard to the particular search or search group.

The steps for time-based querying, an essential part of the present invention, as shown in FIG. 2, may be further described as follows. After the program determines the total number of results based on the search criteria via a first query to the database of interest 302, the program calculates an optimal time window in which a manageable number of results exist 201 (one example of this calculation is provided further herein). Once an optimal time window has been determined, the program determines the current date and time 202. A first time-based query is then made to the database in order to retrieve matching results from one or various time periods which sum to equal one optimal time window 203. This first time-based query retrieves those results which are most actionable and require immediate attention based on the current date and time. The time period(s) associated with the time-based query made are then recorded in a dataset 204 (certain embodiments will comprise more than one dataset), which stores all time periods which have been queried (and thus should not be queried again for the same search criteria). The results retrieved for the time period queried are then presented to the user 205. As the user views and discards results, the program will determine that more results are needed 206 (for example, by employing a threshold amount of results to be available at any given moment). Once this determination is made, another time-based query must be performed; however, the program first consults the dataset to see un-queried time periods 207 and to determine which time period(s) may be queried based on the consultation. The next time period(s), again, sum to equal one optimal time window, so as to retrieve another manageable number of results. Then, the process is repeated from step 202 (determining the current time and sending another time-based query based on the current time).

Every time-based query made to the database is based on the current time, with each subsequent query moving further away from the current time. However, the corresponding dataset may already contain a particular time period, so the program consults the dataset to skip over a recorded time period and avoid retrieving duplicate results. As the dataset is filled with time information, each query asks only for particular time periods which are not yet recorded in the dataset. In this manner, a user may enter search criteria once and return to the application at any time and any number of times, while knowing that the results for a given search will continuously be presented based on urgency and without repetition. The additional queries may continue, becoming more particular until all time periods are queried (i.e., until the dataset is complete), sequentially compiling manageable results to be presented to the user based on time.

Calculating an Optimal or Preferred Time Window

An optimal time window may be calculated by the program using the following logic. Once a total result amount has been retrieved based on a user's search criteria, a period of time, e.g. one month, may be divided by the total result number, which, presuming a standard distribution, yields a value representing the portion of one month which contains one result out of the total result amount. This value may then be multiplied by the number of results desired per query to the database. If, for example, the number of results desired is 100 results, the value yielding one result is multiplied by 100. Therefore, if a total result amount for a search or search group is determined to be 4,000 results, and the desired amount of results per query is 100 results, the following calculation may be made to determine an optimal time window:

$$\text{Optimal time window} = [(\text{one month's time/total results})] * (\text{desired results per query})$$
$$= [((24 \text{ hours})(30 \text{ days}))/4{,}000] * 100$$
$$= 0.18 * 100$$
$$= 18 \text{ hours}$$

It should be noted that the number representing the desired amount of results per query may be a result of limitations in a particular API, such as the maximum number of results that can be returned for each single request. Thus, the desired amount of results per query is preferably that number of results which does not require more than a single request of the database, as each such request imposes load upon the database and latency due to network input/output. It should also be noted that the above calculation need only be an estimate in order to be serviceable. How the calculation is performed beyond this example is a function of any additional data available on hand and the specifics of a particular application (i.e. the particular database and resources available).

Time Window-Based Querying Using the Optimal Time Window

The effect of the present invention is to take a search or group of searches containing many results and manage the output of those results by performing one or more time period-based queries to a database. Each query yields unique results because each searches the data based on user input during a new and different period of time (i.e., a time period representing results that have not yet been seen by the user).

The time periods that are queried are then stored in one or more datasets, which are designed based on the organization of the particular database. The information stored in such datasets is then used to inform the system to query around the time periods stored (for the same search or search group). As each query is uniquely based on a particular time period, the results are equally unique and thus need not be compared against any previous query in order to omit duplicate results. Duplication of results is not possible as long as the database data is organized with respect to single points in time (for example, a start time or a post time).

The present invention is able to efficiently skip over any time-based query that would produce a duplicate result. Periods of unseen data (referred to herein as "holes") may form and grow as time passes. Such holes are accounted for by subsequent queries of the database. For example, assuming an optimal time window of one hour and a hole twenty minutes in length, a subsequent query will first request the twenty minute period corresponding to the hole, followed by a request for a forty minute period of time of unseen data. Thus, the program retrieves the most temporally-relevant results while also accounting for missed time periods and skipping seen time periods.

There may be additional logic, responsive to certain technical aspects of particular databases being searched, which may affect the search and query methodology. For example, a minimum time window size may be indicated (e.g., 12 seconds, 3 seconds), thus setting a maximum rate at which a user may iterate the process. In addition, the program may not query certain databases for results that are less than, for example, 90 seconds old because it may take that long for newer results to settle into their final time-based ordering, as a result of technical details and distributed system transaction settlement. Such delays may vary depending on the systems and programs used by a particular database, and such a value may be determined using methods including but not limited to empirical research.

Variations Based on Timing of a User Request

After retrieving and reviewing a few hundred results previously, the user may ask for a few hundred more at a later time. There is significant variance in this follow up query, typically, due to the high variability in just when the user will make the request, accumulated network latencies, and the timing of the user's previous queries. For example, depending on the time at which the second query is made, the time windows will not necessarily match up with those previously calculated, which will require at least one extra query for the time in between, due to the formation of holes. In some cases, the client may request fresh results every 15 seconds, in which case the first and each subsequent query would progress in even intervals. In another example situation, however, the client may not request fresh results on a regular basis. Instead, the user might browse through a few hours of results, causing several retrieval requests, then take a break, returning to the task a few hours later. When the user returns, and the client makes new requests, queries to the database resume looking for results ending between the current time and, for example (and assuming a time window of ten minutes), ten minutes prior. Eventually, these requests consume the duration of the time which the user was away, but the ten minute intervals will likely not match exactly with the point in time at which the user left his computer. Thus, the ten minute period queries will be spread across a period of time between the current time and the last time period retrieved—perhaps a few minutes, but certainly no less than 15 seconds.

The Cost of De-Duplication of Results is Avoided

When the comparison between old results and new results is required to be performed on a local computer using memory, bandwidth, and processing time provided by both the user and the database, de-duplication is free only from the perspective of the service provider. Desktop software can query databases inefficiently, store the results, and burn up cycles evaluating those results repeatedly against new results. This comparison operation is very expensive and thus not likely to be found in purely online applications, where the ideal service is designed to scale infinitely and accommodate many thousands of users with minimal resource consumption—memory, processing, storage, and bandwidth. Increasingly, users are also running such applications on mobile devices with similarly limited resources. These mobile devices are not capable of delivering a quality user experience given the resource demands of prior art de-duplication methods. The present invention offers a solution to this problem by removing the possibility of retrieving duplicate results, thus removing the requirement of de-duplication using additional resources. Therefore, the present system and method is designed to scale to an unlimited number of users and to run as an application on devices as resource-limited as cell phones and other mobile devices.

Exemplary Embodiments of the Present Invention

One embodiment of the present invention can be described as a computer-implemented method, system, apparatus, or computer program product, for querying a time-ordered database to sort and display a prioritized list of search results. The steps of the method comprise, or the components of the system, apparatus, or computer program product comprise computer-readable instructions to perform the following steps: (a) prompting a user to enter one or more search criteria, said one or more search criteria forming a search group, said prompting comprising providing a search query box for entry of criteria unrelated to time; (b) sending a first query to the database to determine a total results number for said search group, wherein each result comprises an item linked with time data; (c) calculating, using said total results number, an optimal time window, said optimal time window representing a time frame in which a manageable number of results exist, said manageable number being a fraction of said total results number; (d) determining a first present date and time; (e) sending a second query to the database, said second query being a first time-based query requesting a first set of results, said first time-based query being a request for search results associated with one or more time frames, said time frames summing to equal a duration of one optimal time window, said time frames being closest in time to said first present date and time; (f) recording said one or more time frames queried in one or more datasets, wherein said one or more datasets correspond to the search group, said datasets storing only time information; (g) presenting to said user said first set of results, said first set of results being items requiring the most urgent action by said user; (h) determining a need for additional results, said need occurring when said user nears exhaustion of items in said first set of results; (i) determining a second present date and time; (j) sending a third query to the database, said third query being a second time-based query requesting a second set of results, said second time-based query being a request for search results associated with one or more additional time frames, said additional time frames summing to equal a duration of one optimal time window, said additional time frames being outside any time frames recorded in said datasets yet closest in time to said second present date and time; (k) recording said additional time frames queried in said one or more datasets; (l) presenting to said user said second set of results, said second set of results being items requiring less urgency than said items of said first set of results; (m) repeating said steps for time-based querying until said user exits the search group; (n) wherein said datasets with recorded time frames are saved and consulted prior to each time-based query such that a returning user may continue browsing only unseen search results, said unseen search results being items requiring the most urgent action by the user corresponding to a time when said user returns to continue browsing.

In another embodiment, the present invention may comprise an apparatus for dynamically searching and organizing time-indexed database items across multiple discrete searching sessions without storing the items in memory, the apparatus comprising a computer and display for performing the steps of: (a) generating a first non-time-based query to said database, said non-time-based query being based on search terms entered by a user, said first query retrieving a total results group, (b) generating a first time-based query to said database, said time-based query being limited to time data associated with each item, said time data being based on the present time and an optimal time window calculated by the computer, said optimal time window representing a length of time in which a manageable subset of the total results group is estimated to exist, (c) presenting a results list comprising the database items associated with the time data queried, wherein the results list organizes each database item chronologically from the present time, (d) recording said time data queried in a dataset, (e) generating a subsequent time-based query to said database, if needed to present additional results further removed in time from the present time, said subsequent time-based query being limited to time data not yet recorded in said dataset, and (f) presenting a subsequent results list comprising the database items associated with the subsequent time-based query, wherein the subsequent results list continues to organize each database item chronologically from the present time.

In another embodiment, the present invention may comprise a computer program product embodied on non-transitory computer readable medium for dynamically querying a time-indexed database to create a prioritized list of data entries, the product comprising computer code for: (a) sending a general query to the database, said general query comprising search terms entered by a user via a search box displayed to the user, said general query returning a total results number, (b) performing an optimal time window calculation using said total results number, said optimal time window representing an amount of time in which a manageable number of said total results number exist, (c) sending one or more subsequent time-based queries, said subsequent queries comprising requests for data limited to time periods summing to equal said optimal time window, each said time period comprising yet unqueried periods closest in time to the present time, and (d) displaying a list of items resulting from each subsequent time-based query, said items being organized according to the urgency of each item, wherein each listed item contains a description of the item and a link to selected information regarding the item.

In yet another embodiment, the present invention may comprise a computer-implemented method for dynamically reorganizing time-indexed auction and instant purchase listings within a database to present to a user a combination of the most urgent listings, the method comprising: (a) providing a search box for entry of search criteria, said entry being performed once by a user, and (b) displaying a results list comprising items listed in order of urgency, said urgency being determined by the time at which said user performs a search, wherein the results list is formed by the internal computing steps of: (1) calculating a search-specific optimal time window based on a total number of returned results for the search, said optimal time window representing a time frame in which a subset of results exists, said subset being a number of results placing a manageable load on the database and a manageable load on a user device, (2) transmitting one or more time-based queries to said database, said time-based queries requesting results indexed to a time period corresponding to a duration of one optimal time window in the order of time from the present time, and (3) recording each time-based query made in one or more datasets, wherein said datasets are consulted prior to each time-based query such that no time-based query is repeated for the same search criteria, (4) wherein each time-based query returns both auction and instant purchase listings listed together in order of urgency.

EXAMPLE 1

Twitter Search

In one embodiment, the present invention is employed to present particular Twitter postings to a user in a manageable, collated, and time-based fashion. A user may input various search criteria, thus forming a search or search group. The search or search group allows the user to focus only on those topics which interest the user. The program queries the database to obtain a total result number. The program then calculates an optimal time window to retrieve a manageable number of results, as described above. Next, the program sends additional time-based queries to the database to retrieve matching results for a time range corresponding to the optimal time window. Each additional time-based query causes the time period(s) queried to be recorded within one dataset. The program may consult the dataset before sending a query in order to determine if any time periods have already been queried, either during the current session or a past session. Thus, the program presents a modest number of new results to the user per query, moving through the dataset in one direction by orders of the optimal time window, while skipping over any previously queried time periods so as to not present duplicate results. This embodiment provides an example of the present invention which employs a single dataset of time information which is iterated by the program in one direction—either in a direction backwards in time from the current time, or in a direction forward in time from the end of the time last recorded in the dataset.

EXAMPLE 2

Real Estate Database Search

In another embodiment, the present invention may be applied to any real estate database. Real estate listings have a starting time (e.g., when the property entered the market), and any MLS query interface can be leveraged to query for results using the method for time-based querying described herein. Thus, real estate listings may be searched by a user using sets of time-based queries, which are subsequently recorded in a dataset which the program may consult in making subsequent queries. Such datasets may direct all future queries to ask for listings based on time periods not previously queried, thus avoiding the duplication of results of real estate listings. Essentially, the present invention may take any real estate database organized in any manner (e.g., by listing type, by location, by listing duration, etc.) and re-organize that database in a manner which orders listings by the requirement of immediate action. The steps for such reorganization of data are the same as those shown in FIGS. 2 and 3 and described herein. By using the system and method described herein on a large set of results, determining a time window which will contain a smaller number of results from the large set of results, and querying the real estate listing database according to periods of time based on the optimal time window, the user is presented with a reorganized subset of results in chronological order from the current time. Without having to enter search constraints regarding time, the program knows to find and present those listings which are ending soon and those listings which are most recently offered. Thus, by entering only keyword criteria to define a search, a user is automatically presented only with listings most relevant to the current time. The results are further automatically limited to only those which the user has never before seen. The program presents a modest number of new results per query, moving through the dataset in two directions by orders of the optimal time window, while skipping over any previously queried time periods so as to not present duplicate results. This embodiment provides an example of the present invention which employs a single dataset of time information which is iterated by the program both in a direction backwards in time from the current time (finding those listings which were most recently added to the database, and thus may be underpriced) and in a direction forward in time from the end of the time last recorded in the dataset (finding those unseen listings which have been on the market for a long time, and thus may be discounted).

EXAMPLE 3 eBay Search (Multiple Datasets Iterated in One or Two Directions)

In another embodiment of the invention, a computer application makes calls to and receives information from eBay's databases of auction items using eBay's Application Program Interface (API), collecting and then presenting the information to a user in a convenient and simple manner. FIG. 1 illustrates an overview of this entire process, as explained further herein.

eBay's Database Scheme

Though eBay does provide a sophisticated API which can be used to query eBay's live and recently-completed listing data, eBay's API contains some strict semantic limits. For instance, one cannot query for listings using both a "Start-Time" filter and an "EndTime" filter, one cannot query for listings by their listing duration, and the results returned per query are limited to a total of ten thousand listings.

Further complexity stems from the fact that eBay's auction listings are not organized according to how long the listing is to appear to potential purchasers, for instance, 1-day, 3-days, 5-days, 7-days, 10-days, and 30-days ("listing duration"). Due to eBay's particular API and database complexity, additional datasets and a method to omit certain results may further be required to ensure that the results are topical.

First Query to eBay

The computer program of the present invention first sends a general query to eBay to count total results for the entered search criteria. This total result amount is then used to calculate a preferred time window for the particular search or search group. The steps for calculating the preferred time window are shown in FIG. 2 and described in greater detail above.

Additional Queries to eBay

The program then queries each eBay database to retrieve listings responsive to the search criteria provided by the user in a manageable fashion (See FIG. 5 for examples of such queries to the eBay database). The listings retrieved with each query are ready for immediate action because they were recently posted (buyables) or are about to expire (both auctions and buyables). By using an optimal time window calibrated based on the total amount of results, the queries to eBay focus on the starting and/or ending times of the listings within the total number of results for the search criteria initially entered. For example, to find search results for certain listings, corresponding to user criteria, which were posted in the last ten minutes (ten minutes being the calculated time window), the program would query eBay databases for items by their start time, the start time beginning 10 minutes before the current time up until the current time. The program could alternatively perform the same search by querying eBay for items ending one day from now (minus ten minutes), three days from now (minus ten minutes), five days from now (minus ten minutes), seven days from now (minus ten minutes), 10 days from now (minus 10 minutes) and 30 days from now (minus 10 minutes). This process may then be repeated at any time, searching for listings ending between the time of the query (i.e., the current time) and the last ten minutes (plus however many days, depending on the listing duration).

To find search results for certain listings, corresponding to the same user criteria, which end in the next ten minutes, the process may be repeated using similar logic based on the starting time of a listing. Thus, the program would query eBay databases for items starting one day ago (plus ten minutes), three days ago (plus ten minutes), five days ago (plus ten minutes), seven days ago (plus ten minutes), 10 days ago (plus ten minutes), and 30 days ago (plus ten minutes). This process, again, may be repeated at any time, searching for listings ending between the current time and the next ten minutes (minus however many days, depending on the listing duration). Again, alternatively, the program could query eBay for the same items based on their end time, rather than start time. Ultimately, and regardless of whether the program utilizes a listing's start or end time, the present invention offers a method for querying the eBay database simultaneously for all those listings which require a user's immediate attention, including those which are ending soonest as well as those which have been listed most recently, and presenting those listings to the user in a chronological and collated fashion.

In order to separate auctions listed recently (which need not be acted on until they are about to expire) from auction items with a "Buy-It-Now" feature that were recently posted, auctions having a "Buy-It-Now" feature found in all the queries made thus far must be omitted. Instead, another series of queries (and another series of datasets) for auctions alone (without a "Buy-It-Now" feature) is issued that only queries those listings according to their relative ending times. This additional set of queries brings the total number of queries to seventeen (5 queries for each auction listing by duration, 6 queries for each buyable listing by duration, and 6 queries for each "auction plus buyable" listing by duration) and the total number of datasets to eleven (5 datasets, one for each auction type by duration, and 6 datasets, one for each buyable type by duration). As noted previously, eBay auctions without a "Buy-It-Now" feature may not be listed with greater than 10-day durations.

Managing Results via Datasets

With regard to eBay, the time periods which have already been queried to the database are stored in distinct datasets, which are categorized by the listing type and the listing duration within the particular auction database (e.g., 1-day auctions, 1-day buyables, 3-day auctions, 3-day buyables, and so on). As more queries are made to the database, each dataset grows, recording those time periods which have been previously searched. Such a system allows for a user to enter the same search at any time (e.g., different times and/or days), and to see search results without duplicating those results already seen and without sending unnecessary and repetitive queries to the auction database. Instead, what is presented to the user is a set of the most relevant and most actionable items within the auction database, including both those listings which are ending soonest and those most recently listed.

The program consults the datasets to discover those time ranges not yet recorded in the datasets. This discovery may be performed, for example, in two chronological directions—backwards in time from the current time, and forward in time from the end of the time recorded in the datasets, if appropriate given the type of listing associated with each dataset. After discovering those time periods which have yet to be queried, the program sequentially allocates the duration of time represented by the preferred time window across the un-queried time periods. Each query made thus returns an optimal number of unseen results such that both the user and the user's device are presented with a manageable number of results. It should be noted that in the case of implementations comprising multiple datasets and/or the scanning of a dataset in two directions, in order to collate results based on urgency, the same duration of time must be queried for in each dataset and/or from either direction. The only exception to this requirement would be when all un-queried time periods have been consumed in a dataset.

The program may stop making queries based on how many results remain to be displayed to the user. The determination to stop making queries may be based on a required threshold amount of pre-sorted results and/or the rate at which the user is exhausting results.

It is possible to further optimize the queries in certain cases such that in the event that identical time periods from multiple datasets are to be queried, a single query to the database is made and the results of that single query are shared. This would occur, for example, in the situation where queries are suspended for a period of time (e.g., due to user inactivity). In this scenario, the program may issue a single query for a time period up to and including the optimal time window amount, record the time period in each of the datasets, each dataset corresponding to one type of listing and duration, and present the results to the user. Any "holes" which exist nearer to the current time (i.e., one side of the dataset) than they are to the opposite side of the dataset, and which are present in all the datasets, may be similarly dispatched via one or more queries.

Presentation of Results

As a user views results, and as the program continues to run, additional results are collated and sorted in anticipation of presentation to the user. In this embodiment, the program uses a "real time" database (e.g., Firebase) to cache the listings and update the client. Due to limited sorting and querying features of Firebase, the program must compute a special value ("priority value") used for ordering records in the database. This priority value is attached to each piece of data in the cache representing a listing, the value being a function of the listing type (auction vs. buyable) and either a starting time or ending time of a listing. For example, a priority value associated with an auction listing may denote that that particular listing ends at a particular date and time. In another example, a priority value associated with a buyable listing may denote that that particular listing was posted at a particular date and time. As one of ordinary skill in the art will understand, such priority values associated with each listing may be further utilized by the client to filter the collected information within the Firebase into a desired order for presentation (e.g., the client may contain instructions to query for listings ending before a particular time in the future and/or listings started within a particular period of time, thus maintaining relevant listings while also removing listings which have ended or closed based on the associated priority value).

In some cases, this value is bit-shifted in order to essentially overload the 64-bit field. The constraints for the program here are that when a client first loads the cache, each record should be retrieved in the same order that it will be presented to the user. The only eBay listing data that is stored in the cache, however, is the item identifier, so the client queries eBay directly in order to retrieve the data that is eventually presented to the user. The cache may conceivably be several thousand records long, although preferably it holds no more than 300-400 records at any given time. As time passes, the significance of the cached listings changes, and thus the fetched listings existing in the cache must be sorted. This sorting occurs in the client, both as a result of the retrieval of the cache (which should, theoretically, already be sorted) and during periodic sorting operations occurring at regular intervals at times when they can be performed without impeding program performance or user experience. Additionally, when new listings are added to the Firebase (or other database) from remote servers, updating events are triggered in the client such that the new listings may be collated into the existing result set. Similarly, when a second user operating on the same set of results (i.e. a second user scanning results but authenticated using the same login credentials) discards some listings, the client receives notice of their removal and can subtract them from the client's collection of results.

Iterations of queries can be expected as often as four times per minute, depending on usage and search characteristics, in order to yield the freshest results as quickly as possible.

Figure 4:
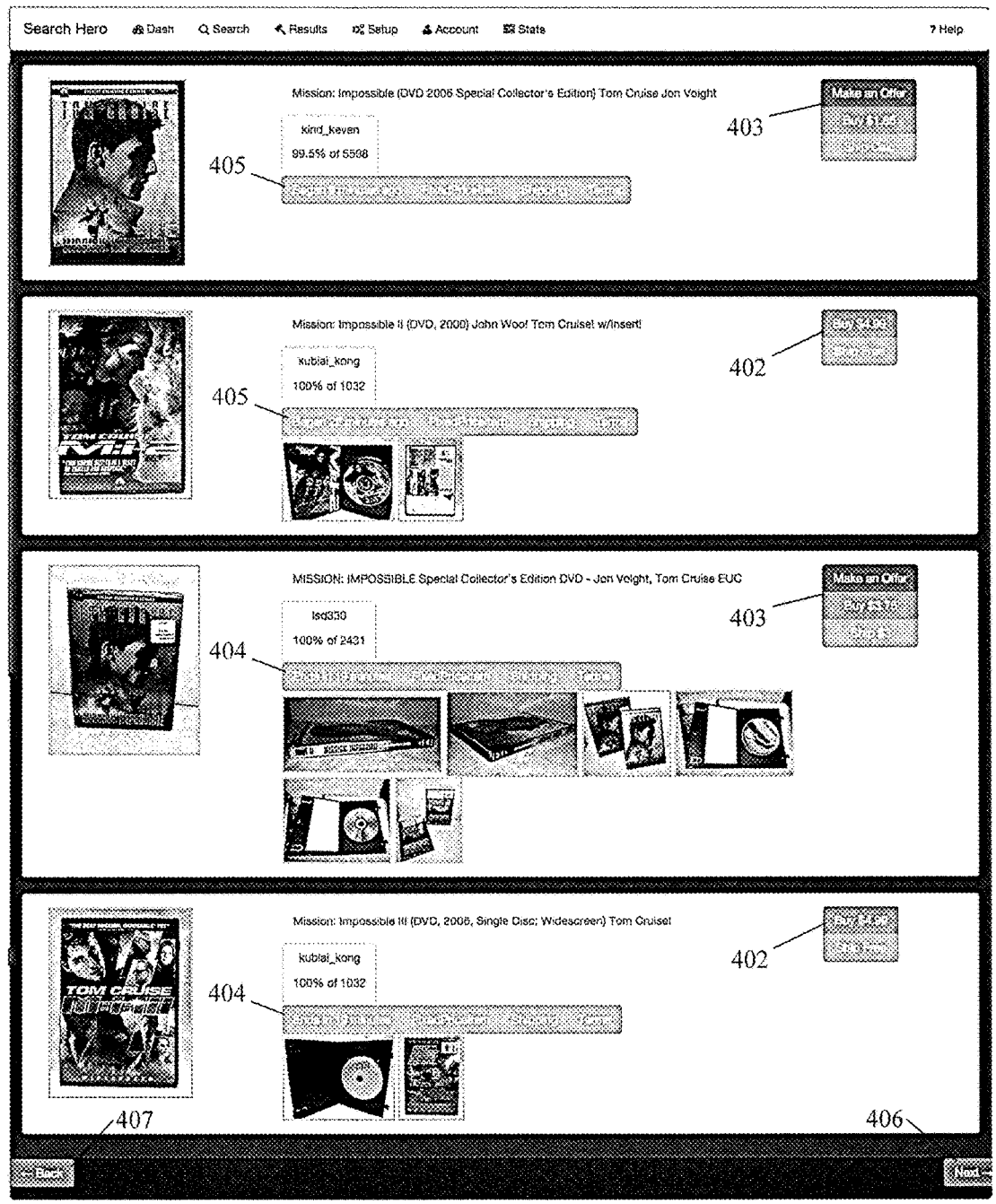
FIG. 4 is a screenshot showing the presentation of results after a search for "Tom Cruise," in accordance with an embodiment of the present invention, is performed.

Only a fraction of the total listings in the auction website databases will be presented to the user in each iteration of the search (FIG. 4 shows an exemplary screenshot of one embodiment of the presentation of results). As the user iterates through the results, the program presents each listing with a metric that shows when the listing began or when it will end, whichever is most relevant, presenting all listings regardless of type or duration (i.e., both auctions and buyable listings are presented in order of chronological relevance). Results flow in asynchronously, as the program makes repeated search calls to the auction database. The application will yield results essentially as fast as the user can click his mouse button. In some embodiments of the user interface associated with the present invention, Past and Future buttons assist a user in navigating, in an orderly fashion, through search results derived from the queries made to the auction database. It is further noted that, in such embodiments, the Future movement (i.e., when a user clicks the Future button) must store (in memory and in the Firebase) the listings that the user discarded in the same order that user discarded them, while presenting the heretofore-unseen listings to the user in the most advantageous order. The Past movement, then, can present and un-discard the previously seen listings in the same proper order, returning those listings to the dynamically sorted pool of unseen results.

Managing Results Using the Cache

A cache may be filled and managed by the program of the present invention in the following exemplary manner. It should be noted that the cache, as described herein, only stores listing item identification information (e.g., a unique identifier) and not the listing item itself. The cache compiles identification information which the program may then use to retrieve the corresponding listing from the database on which it is stored. The following example, while referencing eBay, should not be read to limit such use of a cache to eBay or any other single database. The process described hereinafter may comprise one or more additional steps to the general method of the invention, described above.

The client interfaces directly with the Firebase, which is where the client may store searches, groups, and results. The groups logically associate searches for the purposes of collecting results. Each search may belong to one or more groups. The identification information of the results, indexed by group, comprises the cache. The client loads the groups when it launches (e.g., when a user logs in). When prompted by a user action such as selection of a group of results, the client attaches a monitoring instrument to the group's results, causing retrieval of that group's results as well as delivery of any new results upon arrival and notification of any removal or priority change of existing results. The client now contains some or all of the cached results in memory, depending on whether all or only some of the groups have been selected, and whether the client determines to stop monitoring a group that the user is no longer viewing. The results of all groups may be co-mingled and various projections may be made and compiled upon one another in order to share the information the projections contain and/or extend the logic the projections employ in sorting the results. For example, a "selected" projection may take all the results that are in memory and project a subset representing those groups which have been selected by the user; allowing the user to view multiple sets of results simultaneously, while sorting the results according to the current time and freshness (i.e. immediacy).

A "directed" projection of results may take the selected result projection and further refine it, projecting a subset of results representing unseen listings or seen (i.e. discarded) listings depending on the directional state of a user (i.e., whether the user has most recently pressed the Future button or the Past button). When pointed towards the Future, at the fresh, unseen listings, the size of this "directed" projection is measured in order to decide whether it is appropriate to issue more queries of eBay to fetch more listings. Based on watermark logic, the program may ask for more results whenever it has fewer than, e.g., three hundred listings. This decision is made when the program first loads the results via the cache and periodically thereafter (for example, every fifteen seconds).

A "pre-populate" projection of results may further take the directed projection results and issue queries to eBay to fetch (or refresh) the listing data for those items which require it. Because the input is already in sorted order, the projection maintains a number of active queries of eBay which return data in the background, populating the results with all the data that is missing, which comprises all data other than the item identifier and the starting and ending times of the listing. This "pre-populate" projection groups the items initially into batches of five, then ten, and finally twenty items per query of eBay. This results in a slightly faster initial load of the first few items, which improves the speed with which the program displays results when the user first selects a group.

A "populated" projection may further select particular results from the pre-populate projection, based on further logic employed by the client. This is used by the client as an input to the "paged" projection, which is where the client handles selecting results for display and changing an unseen listing to a seen listing once the user has viewed that listing and moved forward in the "paged" projection—i.e., a "discard" event. As the collection of results receives discard events, the client adjusts the priorities of the listings in the cache.

The projection machinery exemplified above is further described in open source information available to the public (see, e.g., https://github.com/p3drosola/Backbone.VirtualCollection). The referenced link discloses technology which allows for series of projections (cf., one projection) to share and extend logic. For example, if three projections are made (A, B, C), and A contains a superset of B, while B contains a superset of C, any change in the order of one projection may cause a similar change in the other projections, thus making it possible to maintain relative ordering across any or all projections, if desired.

FIG. 4—Tom Cruise DVD Search and Results

The screenshot in FIG. 4 exemplifies the user interface showing results after employment of the system and method described in Example 3. In this example, a user is interested in searching an auction website for "Tom Cruise" in the U.S. category for DVD/Movies. This search was measured via an API call when it was created and found to yield around 2,200 results. That calculation is but a single call to the auction website portal with no time or listing type filters. The program finds the current most actionable items out of the 2,200 results by querying the auction website database(s) for listings which end between the current time and the calculated time window (in both directions—i.e. those listings ending within the next time window, and those listings posted within the past time window, based on ending or starting time). Time windows, again, are calculated and determined based on presenting a manageable number of results (e.g., 100 or less) to a user at one time. The resulting listings may be displayed as shown in FIG. 4. Auction listings (not shown in Figure), buyable listings 402, and combined auction and buyable listings 403, are presented together, ordered by time. Each listing's end time 404 or start time 405, whichever is relevant, is also provided to the user. If the user has scrolled through all the results on a given page, the user may continue to more results which are further removed in time from the current time by using the Future button 406. If the user desires to return to a listing that he/she has passed, the user may do so by using the Past button 407. In this manner, the user scans the results in order of immediacy to the current time. Each time the user logs in to perform a search using the same criteria, the first page of results presented will show those listings which began recently or end soon, limited to those which the user has not discarded before.

Figure 7:
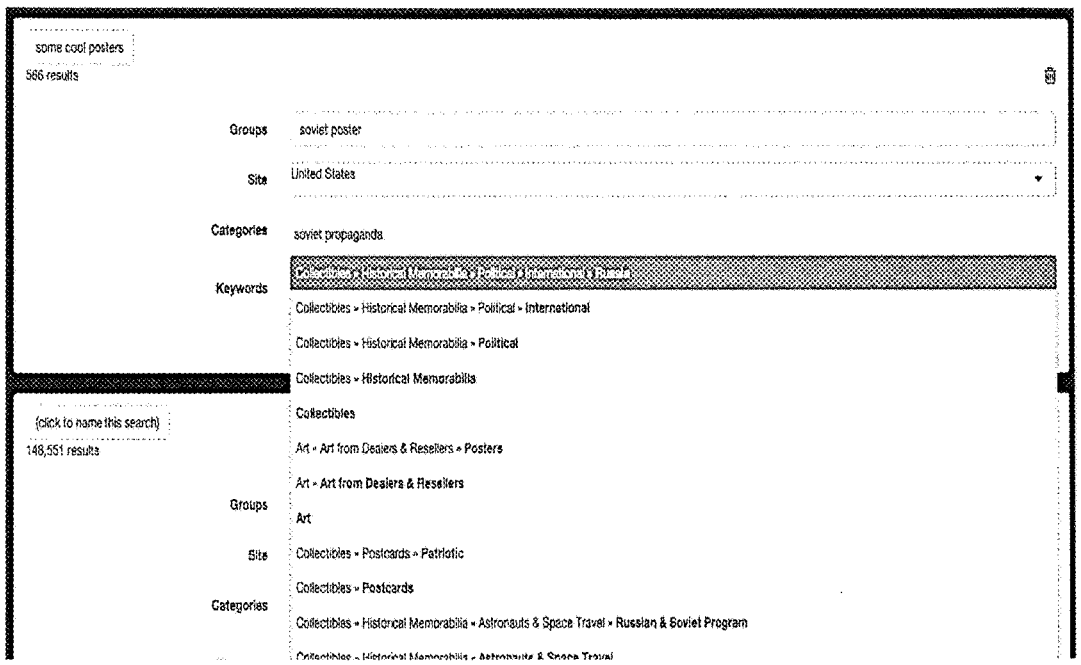
FIGS. 7-8 show additional screenshots of one embodiment of the invention illustrating an opportunity for a user to further limit search results for one or more search groups by utilizing a category finder widget.
Figure 8:
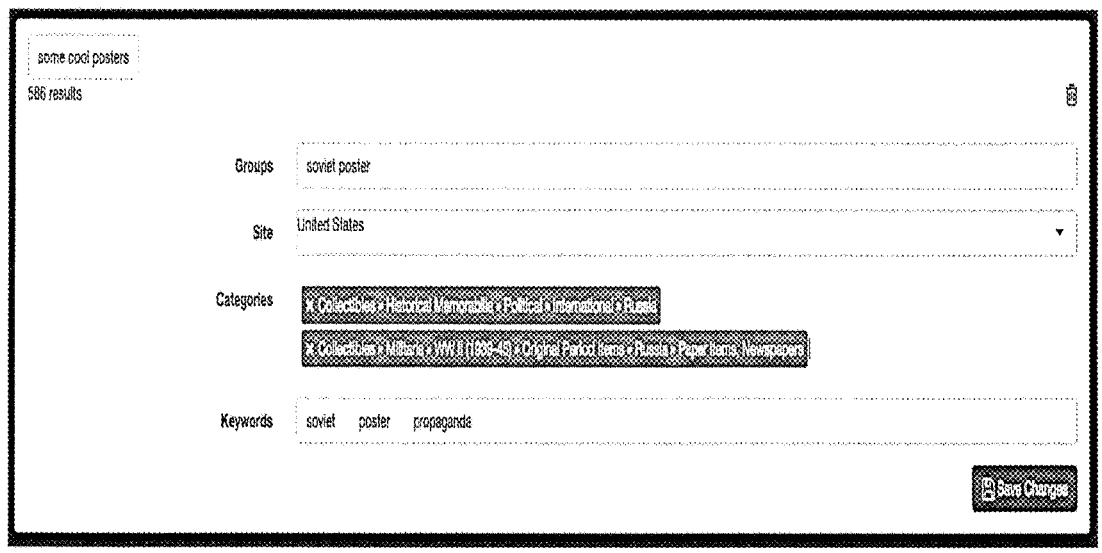

FIGS. 6-8 show screenshot examples of instances where a user may further customize the results received from one or more general time-based queries. For example, the user may desire to query multiple databases simultaneously, include results from various searches, include or omit categories and specific sellers manually or via managed lists, and query according to item specifics, condition, location, delivery date, price, number of bids, and other factors. A user may further be able to search for UPC numbers or website product identifiers (or any other identifying numbers), constrain results to items located in specific parts of a database, and use a database's domain histograms to filter the results by, e.g., size, brand, color, material, etc. For one of various examples, FIG. 6 shows a screenshot where, after receiving results for a particular search group, a user is able, via the display interface, to adjust associated searches to alter their constraints for future result retrieval. The user receives an option to limit or exclude a seller and their items in the current search and/or other searches. Thus, not only is the user receiving the most urgent items listed chronologically, but the user is also able to further customize the list of most urgent items to a particular seller (or to exclude the particular seller). FIGS. 7 and 8 show another manner in which a user may customize original results from one or more search groups. FIGS. 7 and 8 illustrate before and after states, respectively, of an updated search definition (i.e. a further customized search) utilizing a category finder widget, which, based on simple query text from the user, suggests appropriate categories within the database for limiting search results to those categories the user selects. It is noted that any permutation of individual search constraints which is supported by an associated database may be supported by the invention. Any such search may be executed singly or in concert with other such searches, in which case any results produced may be collated.

While the present invention has been described in conjunction with specific embodiments, those of normal skill in the art will appreciate the modifications and variations can be made without departing from the scope and the spirit of the present invention. Such modifications and variations are envisioned to be within the scope of the present disclosure.

What is claimed is:

1. A computer-implemented method for dynamically reorganizing time-indexed auction and instant purchase listings within a database to present to a user a combination of the most urgent listings, the method comprising:
   providing a search box for entry of search criteria, said entry being performed once by a user, and
   displaying a results list based on a particular time that the user enters a search request, the results list comprising items listed in order of urgency, said urgency being determined by the time at which said user performs a search, wherein said time measures and orders the results list, wherein the results list is formed by the internal computing steps of:
   (1) calculating a search-specific optimal time window based on a total number of returned results for the search, said optimal time window representing a time frame in which a subset of results exists, said subset being a number of results placing a manageable load on the database and a manageable load on a user device,
   (2) transmitting one or more time-based queries to said database, said time-based queries requesting results indexed to a time period corresponding to a duration of one optimal time window in an order of time removed from the present time,
   (3) recording each time-based query made in one or more datasets, wherein said datasets are consulted for un-queried time periods to determine which time period may be queried prior to each time-based query such that no time-based query is repeated for the same search criteria, each query yielding a different results list, the different results list consisting of new or old data from the database, wherein each of the different results lists shows unseen results only,
   (4) wherein each time-based query returns both auction and instant purchase listings listed together in order of urgency.

2. The method of claim 1, wherein said one or more datasets store only time information.

3. The method of claim 1, wherein said time-based queries request results moving backwards in time from the present time.

4. The method of claim 1, wherein said time-based queries request results moving forward in time from the present time.

5. The method of claim 1, wherein said time-based queries simultaneously request both results moving forward in time from the present time and results moving backwards in time from the present time.

6. The method of claim 1, wherein said optimal time window is based on a number of results which does not require more than a single request being sent to the database.

7. The method of claim 1, wherein said user device is a mobile device.

8. A computer program product embodied on a non-transitory computer readable medium for dynamically querying a time-indexed database to create a prioritized list of data entries, the product comprising computer code for:
   sending a general query to the database, said general query comprising search terms entered by a user via a search box displayed to the user, said general query returning a total results number,
   performing an optimal time window calculation using said total results number, said optimal time window representing an amount of time in which a manageable number of said total results number exist, said optimal time window further representing a number of results placing a manageable load on the database and a manageable load on a user device,
   sending one or more subsequent time-based queries, said subsequent queries comprising requests for data limited to time periods summing to equal said optimal time window, each said time period comprising yet unqueried periods closest in time to the present time,
   displaying on a user device a list of items resulting from each subsequent time-based query based on a particular time that the user enters a search request, said items being organized according to the urgency of each item, wherein said time measures and orders the results list, wherein each listed item contains a description of the item and a link to selected information regarding the item, and recording each time-based query performed in a dataset, said dataset storing all time periods queried for a given search group, wherein said dataset is consulted for un-queried time periods to determine which time period may be queried prior to each subsequent time-based query such that no time-based query is repeated for the same search criteria, each query yielding a different results list, the different results list consisting of new or old data from the database, wherein each of the different results lists shows unseen results only.

9. The product of claim 8, wherein said list of items comprises both data entries entered most recently and data entries expiring soonest.

10. The product of claim 8, wherein said items resulting from each time-based query are cached before being presented to a user.

11. The product of claim 8, wherein said time-based queries request results moving backwards in time from the present time.

12. The product of claim 8, wherein said time-based queries request results moving forward in time from the present time.

13. The product of claim 8, wherein said time-based queries simultaneously request both results moving forward in time from the present time and results moving backwards in time from the present time.

14. The product of claim 8, wherein said optimal time window is based on a number of results which requires at most a single request being sent to the database.

15. The product of claim 8, wherein said user device is a mobile device.

16. An apparatus for dynamically searching and organizing time-indexed database items across multiple discrete searching sessions without storing the items in memory, the apparatus comprising a computer and display for performing the steps of:

generating a first non-time-based query to said database, said non-time-based query being based on search terms entered by a user, said first query retrieving a total results group, generating a first time-based query to said database, said time-based query being limited to time data associated with each item, said time data being based on the present time and an optimal time window calculated by the computer, said optimal time window representing a length of time in which a manageable subset of the total results group is estimated to exist, presenting a results list based on a particular time that the user enters a search request, the results list comprising the database items associated with the time data queried, wherein the results list organizes each database item chronologically from the present time, wherein said time measures and orders the results list, recording said time data queried in a dataset, generating a subsequent time-based query to said database, if needed to present additional results further removed in time from the present time, said subsequent time-based query being limited to time data not yet recorded in said dataset, and presenting a subsequent results list comprising the database items associated with the subsequent time-based query, wherein the subsequent results list continues to organize each database item chronologically from the present time, each subsequent query yielding a different result list, the result list consisting of new or old data from the database, wherein each of the different result lists shows unseen results only.

17. The apparatus of claim 16, wherein said results list comprises a collated list of both items entered most recently and items expiring soonest.

18. The apparatus of claim 16, wherein said time-based queries request results moving backwards in time from the present time.

19. The apparatus of claim 16, wherein said time-based queries request results moving forward in time from the present time.

20. The apparatus of claim 16, wherein said optimal time window is based on a number of results which requires at most a single request being sent to the database.

* * * * *